(12) United States Patent
Shah et al.

(10) Patent No.: US 7,210,555 B2
(45) Date of Patent: May 1, 2007

(54) LOW FREQUENCY ACOUSTIC ATTENUATOR FOR USE IN DOWNHOLE APPLICATIONS

(75) Inventors: Vimal V. Shah, Sugar Land, TX (US); Eugene J. Linyaev, Houston, TX (US); Donald G. Kyle, The Colony, TX (US); Wallace R. Gardner, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 367 days.

(21) Appl. No.: 10/882,915

(22) Filed: Jun. 30, 2004

(65) Prior Publication Data

US 2006/0000665 A1 Jan. 5, 2006

(51) Int. Cl.
*F16F 15/02* (2006.01)
*F16F 7/00* (2006.01)
*G01V 1/04* (2006.01)
*G01V 1/16* (2006.01)

(52) U.S. Cl. ...................... 181/108; 181/113; 181/122; 181/207

(58) Field of Classification Search ................ 181/207, 181/208, 108, 113, 122; 367/82, 188
See application file for complete search history.

(56) References Cited

U.S. PATENT DOCUMENTS

| | | | |
|---|---|---|---|
| 2,810,546 A * | 10/1957 | Eaton et al. .................. 367/82 |
| 3,191,143 A | 6/1965 | Pardue | |
| 3,265,091 A | 8/1966 | DeJarnett | |
| 3,588,804 A | 6/1971 | Fort | |
| 3,861,494 A * | 1/1975 | Grego ......................... 181/207 |
| 3,926,265 A * | 12/1975 | Bouyoucos .................. 173/80 |
| 3,971,447 A * | 7/1976 | Ahlberg et al. ............. 173/128 |
| 4,066,995 A | 1/1978 | Matthews | |

(Continued)

FOREIGN PATENT DOCUMENTS

DE 3347827 A1 * 3/1985

(Continued)

OTHER PUBLICATIONS

Chang, Dworak, Hsu, Lau, Masson, Mayes, Mcdaniel, Randall, Kostek, Plona "Sonic Compressional Measurements While Drilling"; SPWLA 35th Annual Logging Symp., Jun. 19-22, 1994.

Primary Examiner—Edgardo San Martin
(74) Attorney, Agent, or Firm—Conley Rose, P.C.

(57) ABSTRACT

An acoustic attenuator includes a housing having an inner side surface which defines an interior chamber and at least one dampening member both physically and acoustically coupled to the housing and projecting into the interior chamber. Acoustic energy propagating within the housing is deflected into the dampening members for acoustically dispersal within the interior chamber. In various aspects thereof, the dampening members may include one or a group of two or more generally cylindrical sleeves having one end both physically and acoustically coupled to the housing and a second end projecting into the interior chamber. Preferably, when a group of two or more cylindrical sleeves are employed, the sleeves are nested within one another. The dampening members may further include a second, oppositely disposed, group of two or more acoustic attenuators nested within one another and interdigitated with the first group of cylindrical sleeves.

15 Claims, 6 Drawing Sheets

U.S. PATENT DOCUMENTS

| | | | | |
|---|---|---|---|---|
| 4,168,754 | A | * | 9/1979 | Nyholm .................... 175/325.2 |
| 4,314,365 | A | | 2/1982 | Petersen et al. |
| 4,320,473 | A | | 3/1982 | Smither et al. |
| 4,439,167 | A | | 3/1984 | Bishop et al. |
| 4,844,181 | A | | 7/1989 | Bassinger |
| 4,901,806 | A | | 2/1990 | Forrest |
| 5,240,221 | A | * | 8/1993 | Thomasen ................... 248/559 |
| H1317 | H | * | 6/1994 | Ng .............................. 181/207 |
| 5,510,582 | A | | 4/1996 | Birchak et al. |
| 5,528,005 | A | * | 6/1996 | Bschorr et al. ............. 181/208 |
| 5,550,335 | A | * | 8/1996 | Ermert et al. ................ 181/207 |
| 5,583,324 | A | * | 12/1996 | Thomasen ................... 181/199 |
| 5,646,379 | A | | 7/1997 | Hsu et al. |
| 5,796,677 | A | | 8/1998 | Kostek et al. |
| 5,798,488 | A | * | 8/1998 | Beresford et al. .......... 181/102 |
| 5,831,934 | A | | 11/1998 | Gill et al. |
| 5,895,013 | A | * | 4/1999 | Towfiq ........................ 244/119 |
| 6,082,484 | A | * | 7/2000 | Molz et al. .................. 181/102 |
| 6,279,679 | B1 | * | 8/2001 | Thomasen ................... 181/208 |
| 6,536,555 | B1 | * | 3/2003 | Kelsic et al. ................ 181/207 |
| 6,615,949 | B1 | | 9/2003 | Egerev et al. |
| 6,834,743 | B2 | * | 12/2004 | Arian et al. ................. 181/102 |
| 6,899,197 | B2 | * | 5/2005 | Arian et al. ................. 181/102 |
| 7,068,183 | B2 | * | 6/2006 | Shah et al. ............... 340/854.4 |
| 2003/0052185 | A1 | | 3/2003 | Arian et al. |
| 2003/0179101 | A1 | | 9/2003 | Jenkins |
| 2005/0173185 | A1 | * | 8/2005 | Pabon et al. ................ 181/108 |
| 2005/0279565 | A1 | * | 12/2005 | Arian et al. ................. 181/121 |

FOREIGN PATENT DOCUMENTS

| DE | 4141343 A1 | * | 5/1993 |
|---|---|---|---|
| WO | WO96/21871 A1 | | 7/1996 |

* cited by examiner

LOW FREQUENCY ACOUSTIC ATTENUATOR FOR USE IN DOWNHOLE APPLICATIONS

CROSS-REFERENCE TO RELATED APPLICATIONS

This application is related to co-pending U.S. patent application Ser. No. 10/882,915, entitled "A Drill String Incorporating An Acoustic Telemetry System Employing One Or More Low Frequency Acoustic Attenuators And An Associated Method Of Transmitting Data", filed on even date herewith, assigned to the Assignee of the present application, and hereby incorporated by reference as if reproduced in its entirety.

STATEMENT REGARDING FEDERALLY SPONSORED RESEARCH OR DEVELOPMENT

Not applicable.

BACKGROUND

1. Technical Field

The present disclosure relates to an acoustic attenuator for use in downhole applications. More particularly, the present disclosure relates to a low frequency downhole acoustic attenuator configured to attenuate acoustic signals at frequencies below 5 kHz and preferably in a low frequency bandwidth extending from about 300 Hz to about 2 kHz.

2. Description of Related Art

Geologists and geophysicists are often interested in the characteristics of subsurface earth formations encountered by a drill bit as it drills a well for the production of hydrocarbons from the earth. Such information is useful in determining the correctness of the geophysical data used to choose the drilling location and in choosing subsequent drilling locations. In horizontal drilling, such information can also be useful in determining the location of the drill bit and the direction that drilling should follow. It should be readily appreciated by those skilled in the art that the foregoing is but a rudimentary description of some of the ways in which information regarding the characteristics of a subsurface earth formation would be useful to geologists, geophysicists and/or others involved in the exploration of the subsurface earth formation. It is, however, a sufficiently detailed description for the purposes disclosed herein.

Information related to the characteristics of a subsurface earth formation can be derived in a number of ways. For example, cuttings from the mud returned from the drill bit location can be analyzed or a core can be bored along the entire length of the borehole. Alternatively, the drill bit can be withdrawn from the borehole and a wireline logging tool can be lowered into the borehole to take measurements. Other approaches, commonly referred to as either measurement-while-drilling (MWD) or logging-while-drilling (LWD) techniques, involve the use of tools which make measurements in the borehole while the drill bit is working. Of the aforementioned techniques, MWD and LWD are generally preferred because, by employing such techniques, information related to the subsurface earth formation may be acquired quicker and at lower cost. Currently, however, the bandwidth available for downhole telemetry systems, for example, mud pulse or electromagnetic (EM) telemetry systems, is insufficient for transmitting essential MWD or LWD data in real time. As a result, data acquired by a MWD or LWD tool is often stored in a local memory in the tool and not retrieved from the local memory until after the tool has been removed from the borehole. As a result, data acquired by a MWD or LWD tool is not always available for analysis in real time.

The transmission of acoustic telemetry data through the drill pipe itself has been periodically contemplated. Acoustic telemetry systems which transmit acoustic data through a drill pipe have been able to transmit data at rates exceeding 50 bits-per-second (bps). A problematic issue related to the transmission of acoustic data through a drill pipe while drilling operations are being conducted is that on-going drilling operations tend to generate wide bandwidth noise which contaminates the acoustic data transmission channel through which acoustic data is being transferred. One source of such noise is the drill bit typically located at the end of the drill pipe. Another is the top drive or other mechanical equipment located at the surface and coupled to the drill pipe. Regardless of the source thereof, such noise tends to reduce the signal-to-noise (SNR) ratio within the acoustic data transmission channel. As a result, the rate at which acoustic data may be transmitted through the acoustic data transmission channel is reduced.

It should be appreciated that, by incorporating one or more devices capable of absorbing low frequency acoustical energy into a drill string, the amount of noise entering an acoustic data transmission channel of the drill string would be reduced. As a result, data acquired by a downhole data transceiver and transmitted to the surface via the acoustic data transmission channel is less likely to be contaminated by extraneous noise.

BRIEF DESCRIPTION OF THE DRAWINGS

A better understanding of the present invention can be obtained when the detailed description is considered in conjunction with the following drawings, in which.

SUMMARY

Figure 1:
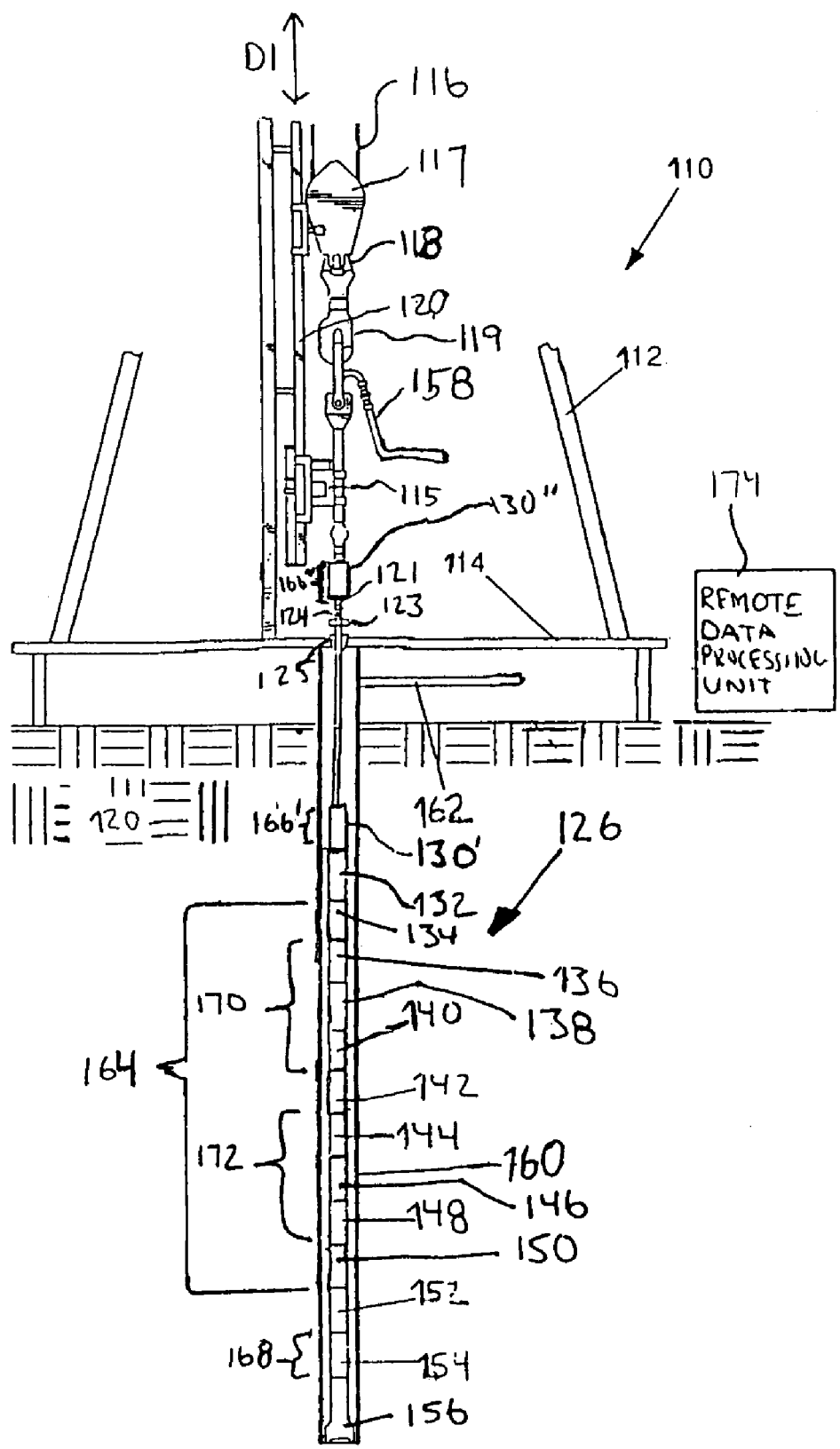
FIG. 1 illustrates a first drilling site where a representatively illustrated drill string incorporating an acoustic telemetry system transmits downhole information to the surface in real time.

In one embodiment, the present invention is directed to an acoustic attenuator comprised of an external housing having an inner side surface which defines an interior chamber and at least one dampening member acoustically coupled to the external housing. Acoustic energy propagating within the external housing is deflected into the at least one dampening member for acoustic dispersal thereby. In another embodiment thereof, the at least one dampening member is positioned within the interior chamber and is physically coupled to the external housing. In various further embodiments, the dampening members may include one or a group of two or more generally cylindrical sleeves having one end both physically and acoustically coupled to the external housing and a second end projecting into the interior chamber. Preferably, when a group of two or more cylindrical sleeves are employed, the sleeves are nested within one another. In still another further embodiment thereof, the dampening members may further include a second, oppositely disposed, group of two or more acoustic attenuators nested within one another and interdigitated with the first group of cylindrical sleeves.

In further aspects of each of the foregoing embodiments, the acoustic attenuator further includes first and second impedance mismatches. In accordance with these aspects, acoustic energy propagating within the external housing is trapped between the first and second impedance mismatches. The first and second impedance mismatches may be formed by first and second variances, respectively, in the radial dimension of the external housing.

NOTATION AND NOMENCLATURE

Certain terms are used throughout the following description and claims to refer to particular system components. This document does not intend to distinguish between components that differ in name but not in function.

In the detailed description and claims which follow, the terms "including" and "comprising" are used in an open-ended fashion, and thus should be interpreted to mean "including, but not limited to . . . ".

The term "couple" or "couples" is intended to mean either an indirect or direct electrical, mechanical, or thermal connection. Thus, if a first device couples to a second device, that connection may be through a direct connection, or through an indirect connection via other devices and connections.

The terms "MWD systems" and "LWD systems" generally refer to those systems which provide wellbore directional surveys, petrophysical well logs, and drilling information in real time while drilling. They do so by employing instrumented drill collars and a downhole-to-surface data telemetry system.

The term "MWD" generally refers to measurements acquired downhole while drilling or specifically to describe directional surveying and drilling-related measurements.

The term "LWD" generally refers to petrophysical measurements, similar to open hole wireline logs, acquired while drilling.

The term "uplink" generally refers to the transmission of signals from a data acquisition device towards a data processing device.

The term "downlink" generally refers to the transmission of signals from a data processing device towards a data acquisition device.

The term "transceiver" is a device capable of both transmitting and receiving signals. When the terms "transmitting" and "receiver" are used in conjunction with the term "transceiver", the foregoing terms may indicate either the transmitting or receiving functionality within a transceiver or the direction of data or control signals relative thereto. For example, an acoustic transceiver serves as an acoustic transmitter during an uplink transmission of acoustic data but serves as an acoustic receiver during a downlink transmission of acoustic data.

DETAILED DESCRIPTION

It should be clearly understood that the present invention is susceptible to various modifications and alternative forms, specific embodiments of which are shown by way of example in the drawings and detailed description set forth herein. It should be clearly understood, however, that the drawings and detailed description set forth herein thereto are not intended to limit the invention to the particular form disclosed. On the contrary, the intention is to cover all modifications, equivalents and alternatives falling within the spirit and scope of the present invention as defined by the claims appended hereto.

Referring now to the figures, FIG. 1 illustrates a drilling site where a representatively illustrated drill string incorporating plural low frequency acoustic attenuators, each constructed in accordance with the teachings of the present invention, will now be described in greater detail. Of course, it should be clearly understood that, in FIG. 1, drill string 126 has been greatly simplified for ease of illustration and numerous details related to the drill string 126 not needed for a complete understanding of the principles of the present invention have been omitted for ease of description. For example, the drilling collars which secure the various sections of the drill string 126 to one another have been omitted from FIG. 1. Further, devices that are oftentimes incorporated into drilling collars, for example, downhole data transceivers, appear as discrete sections of the drill string 126. Still further, the drill string 126 would typically include a combination of longer, shorter, more numerous or fewer sections of drill pipe than the fourteen sections of equal length described and illustrated herein. Finally, while the drill string 126 is shown to include only a single downhole data transceiver, drill strings typically include any number and/or variety of downhole data transceivers or other types of downhole tools.

As may now be seen, a drilling rig 110 includes a derrick 112, derrick floor 114, draw works 116, traveling block 117, hook 118, swivel 119, saver sub 121, slips 125 and the drill string 126 which, as shown in FIG. 1, is positioned in borehole 160. The drilling rig 110 is also equipped with a top drive 115, slidingly coupled to a torque track 120, to enable vertical movement of the top drive 115 along axis D1. The drill string 126, which is supported by slips 125 projecting upwardly from the derrick floor 114, is coupled to the top drive 115 through the saver sub 121. A drill pipe elevator 123 secured to elevator bales 124 extending from the top drive 115 moves the drill string 126 vertically with the top drive 115. Thus, when the top drive 115 is raised or lowered by the traveling block 117 along the axis D1, the drill string 126 is raised or lowered along the axis D2 as well.

The drill string 126 is comprised of plural sections coupled to one another by an appropriate number of drill collars (not shown) or other conventional coupling structures. As previously indicated, the drill string 126 is representatively illustrated in FIG. 1. As a result, the physical appearance of the sections of the drill string 126 may vary dramatically from that shown in FIG. 1. Additionally, the actual lengths of the various sections of the drill string 126 do not necessarily bear any relationship to the lengths of such sections as they appear in FIG. 1. For example, while a first section of the drill string 126 may have an actual length which is several times greater than the actual length of a second section of the drill string 126, in FIG. 1, the first and second sections of the drill string 126 may appear (or not appear) to be of equal length. Finally, the number and length of the sections of the drill string 126 illustrated in FIG. 1 are purely arbitrary. Accordingly, a physical implementation of the drill string 126 may include any number and type of sections, including types of sections not specifically disclosed herein.

For example, in the embodiment shown in FIG. 1, the drill string 126 is comprised of a first section 130', a second section 132, a third section 134, a fourth section 136, a fifth section 138, a sixth section 140, a seventh section 142, an eighth section 144, a ninth section 146, a tenth section 148, an eleventh section 150, a twelfth section 152, a thirteenth section 154 and a fourteenth section 156. In this embodiment, the first section 130' of the drill string 126 is a first low frequency acoustic attenuator, the second section 132 of the drill string 126 is a surface transceiver, the third section 134 of the drill string 126 is a first section of drill pipe, the fourth section 136 of the drill string 126 is a first acoustic transceiver, the fifth section 138 of the drill string 126 is a second low frequency acoustic attenuator, the sixth section 140 of the drill string 126 is a second acoustic transceiver, the seventh section 142 of the drill string 126 is a second section of drill pipe, the eighth section 144 of the drill string 126 is a third acoustic transceiver, the ninth section 146 of the drill string 126 is a third low frequency acoustic attenuator, the tenth section 148 of the drill string 126 is a fourth acoustic transceiver, the eleventh section 150 of the drill string 126 is a third section of drill pipe, the twelfth section 152 of the drill string 126 is a downhole transceiver, for example, an LWD tool, the thirteenth section 154 of the drill string 126 is a fourth low frequency acoustic attenuator and the fourteenth section 156 of the drill string 126 is a drill bit.

Drilling mud is injected into the swivel 121 by a drilling mud supply line 158. The drilling mud travels through the top drive 115, the saver sub 121, the first through thirteenth sections 130' through 154 of the drill string 126 and into the drill bit 156 where the drilling mud exits through ports (not shown) in the drill bit 156. The drilling mud then flows up through the borehole 160. A drilling mud return line 162 returns drilling mud from the borehole 160 and circulates it to a drilling mud pit (not shown) and back to the drilling mud supply line 158. Data acquired by the downhole data transceiver 154, for example, LWD acoustic telemetry (LAT) data is transferred uplink to the surface using an acoustic telemetry system implemented by the downhole data transceiver 154, the surface transceiver 132 and an acoustic transmission channel 164 extending, as shown in FIG. 1, from the downhole data transceiver 154 to the surface transceiver 132. The acoustic transmission channel 164 is implemented, in the disclosed downhole environment, using sections of the drill pipe of the drill string 126, for example, the first drill pipe section 134, the second drill pipe section 142 and the third drill pipe section 150.

Continuing to refer to FIG. 1, the aforementioned acoustic transmission channel 164, as well as the plural low frequency acoustic attenuators 130', 138, 146 and 154 used in conjunction with the acoustic transmission channel 164 shall now be described in greater detail. It should first be noted, however, that the low frequency acoustic attenuators 130', 138, 146 and 154 described and illustrated herein are configured for attenuating compressional waves. It is fully contemplated, however, that the low frequency acoustic attenuators 130', 138, 146 and 154 would also attenuate lateral vibrations or torsional vibrations that had undergone full or partial mode conversion into compressional waves. It is further contemplated that the acoustic transmission channel 164 could also be equipped with one or more additional low frequency acoustic attenuators configured to attenuate torsional, rather than compressional, vibrations. Variously, such low frequency torsional acoustic attenuators may be used exclusive of, or in conjunction with, the low frequency compressional acoustic attenuators described and illustrated herein. Such an alternate configuration would be particularly useful in conjunction with a torsional wave telemetry system.

On opposite ends thereof, the acoustic transmission channel 164 is bounded by a first (or "upper") terminator 166' and a second (or "lower") terminator 168, respectively. As will be more fully described below, the upper and lower terminators 166' and 168 act to prevent external noise originating from those portions of the drill string 126 located above and below the acoustic transmission channel 164, respectively, from entering the acoustic transmission channel 164 where the external noise would interfere with the uplink transmission of the LAT data from the downhole data transceiver 152 to the surface transceiver 129 via the acoustic transmission channel 164. The lower terminator 168 is implemented, in the downhole environment, by coupling a low frequency acoustic attenuator, preferably, a low frequency acoustic attenuator configured to attenuate acoustical noise in the range of about 400 Hz to about 2 kHz, in a lower portion of the drill string 126, preferably between the drill bit 156 and the downhole transceiver 152. Similarly, the upper terminator 166' is implemented, in the downhole environment by coupling a low frequency acoustic attenuator, preferably a low frequency acoustic attenuator configured to attenuate acoustical noise in the range of about 400 Hz to about 2 kHz, in an upper portion of the drill string 126, preferably between the surface transceiver 132 and the top drive 115 (or other mechanized system) responsible for vertical movement of the drill string. 126.

As set forth in greater detail in co-pending U.S. patent application Ser. No. 10/882,730, entitled "A Drill String Incorporating An Acoustic Telemetry System Employment One Or More Low Frequency Acoustic Attenuators And An Associated Method Of Transmitting Data" and previously incorporated by reference as if reproduced in its entirety, the first and fourth low frequency acoustic attenuators 130' and 154 prevent external noise from entering the acoustic transmission channel 164. More specifically, by coupling the downhole data transceiver 152 to the drill bit 156 such that the fourth low frequency acoustic attenuator 154 is positioned between the drill bit 156 and the downhole data transceiver 152, acoustical noise generated by the drill bit 156 is attenuated as it propagates through the fourth low frequency acoustic attenuator 154, thereby reducing contamination of the acoustic transmission 164 by drill bit noise. In turn, the SNR within the acoustic transmission channel 164 is increased, the telemetry rate for the acoustic transmission channel 164 is improved and the overall robustness of the acoustic transmission channel 164 is enhanced. In addition, the fourth low frequency acoustic attenuator 154 will prevent downlink control data from reflecting off of the bottom of the drill string 126 and back up the acoustic transmission channel 164 where it could potentially contaminate subsequently transmitted commands.

Similarly, by coupling the first low frequency attenuator 130' to the surface transceiver 132 such that the first low frequency attenuator 130' is positioned between the surface transceiver 132 and the top drive 115 or other surface equipment responsible for vertical movement of the drill string 126, acoustical noise generated by the top drive 115 would be attenuated before the noise enters the acoustic transmission channel 164 and contaminates the uplink acoustic data or downlink control data. The first low frequency acoustic attenuator would also prevent uplink data from reflecting off the top of the drill string 126 and returning downlink where the reflected data could interfere with subsequently transmitted bits of data.

In addition, FIG. 1 shows plural low frequency acoustic attenuators, preferably, low frequency acoustic attenuators respectively configured to attenuate acoustical noise in the range of about 400 Hz to about 2 kHz, more specifically, the second and third low frequency acoustic attenuators 138 and 146 being coupled at intermediate locations along the drill string 126. Each of these low frequency acoustic attenuators 138 and 146 serve as part of acoustic repeaters 170 and 172, respectively, of the acoustic transmission channel 164. More specifically, the acoustic repeater 170 is comprised of the low frequency acoustic attenuator 138 sandwiched between the first acoustic transceiver 136 and the second acoustic transceiver 140 while the acoustic repeater 172 is comprised of the low frequency acoustic attenuator 146 sandwiched between the third acoustic transceiver 144 and the fourth acoustic transceiver 148. In the disclosed configuration, the low frequency acoustic attenuators serve to acoustically isolate the corresponding pair of transceivers from one another while a bi-directional non-acoustic coupling (not shown) enables the exchange of signals between the acoustic transceivers. Of course, while FIG. 1 shows the drill string 126 as including two such acoustic repeaters, specifically, the acoustic repeaters 170 and 172, it should be clearly understood that the number of acoustic repeaters included within a drill string will vary on a number of factors such as the length of the acoustic transmission channel over which data is to be transmitted and the rate of signal loss for the acoustic transmission channel.

The acoustic repeaters 170 and 172 serve to enable data to acoustically propagate along a greater length of drill pipe than would ordinarily be possible without employing the acoustic repeaters as part of the drill string 126. For example, in a typical operation, the downhole data transceiver 152 acquires downhole information and converts it into acoustical data for propagation along the acoustic transmission channel 164. Signal loss which normally occurs over a section of drill pipe, for example, the drill pipe section 150, may prevent the data from reaching the surface transceiver 132 where it would be converted into electrical signals and transmitted, by the surface transceiver 132, to remote data processing unit 174. Depending on various factors, for example, the length of the drill string 126, the data may need to be periodically regenerated as it is transmitted uplink along the acoustic transmission channel 164 to ensure that the uplink data reaches the surface transceiver 132. For example, rather than being dissipated by signal loss while propagating uplink along drill pipe section 150, upon being detected by the acoustic transceiver 148, the acoustic transceiver 148 converts the detected data signal into a non-acoustic signal, here, for example, an electrical data signal. The acoustic transceiver 148 then transmits the data to the acoustically isolated (relative to the acoustic transceiver 148) acoustic transceiver 144 over a link (not shown), for example, an electrical link. There, the electrical data signal is reconverted into a data signal and again acoustically propagated uplink, here, along the drill pipe section 142 of the acoustic transmission channel 164, until being detected by the next acoustic transceiver, here, the acoustic transceiver 140.

Before proceeding to FIG. 2, a second, preferred, configuration of the drill string 126 will now be described. As previously set forth, the drill string 126 was configured to include a first section 130' comprised of a first low frequency acoustic attenuator configured to attenuate acoustical noise in the range of about 400 Hz to about 2 kHz. As was also previously set forth, the first low frequency acoustic attenuator 130' was positioned such that it bounded the acoustic transmission channel 164 and served as the upper terminator 166' for the acoustic transmission channel 164. As the upper terminator 166' for the acoustic transmission channel 164, the first low frequency acoustic attenuator 130' prevented external noise originating from those portions of the drill string 126 located above the acoustic transmission channel 164 from entering the acoustic transmission channel 164. Furthermore, by positioning the first low frequency attenuator 130' between the surface transceiver 132 and the top drive 115 or other surface equipment responsible for vertical movement of the drill string 126, acoustical noise generated by the top drive 115 was attenuated before the noise entered the acoustic transmission channel 164 and contaminated the uplink acoustic data or downlink control data.

To more effectively attenuate acoustical noise generated by the top drive 115, it is further contemplated that, in this second, preferred, configuration of the drill string 126, in place of the low frequency acoustic attenuator 130', the drill string 126 is instead configured to include low frequency acoustic attenuator 130". Unlike the low frequency acoustic attenuator 130', the low frequency acoustic attenuator 130" is positioned, along the drill string 126, immediately below the top drive 115 or other source of surface noise. In this embodiment, the low frequency acoustic attenuator 130" will still serve as upper terminator 166" for the acoustic transmission channel 164. However, because of its proximity to the source of the surface noise, specifically, the top drive 115, which may potentially contaminate the acoustic transmission channel 164, it is contemplated that the low frequency acoustic attenuator 130" will more effectively attenuate surface noise. It is further contemplated that, by positioning the low frequency acoustic attenuator 130" immediately below the top drive 115, the exchange of signals between the surface transceiver 132 and the remote data processing unit 174 will be simplified in that the communication path will no longer need to circumvent the low frequency acoustic attenuator 130'.

Figure 2:
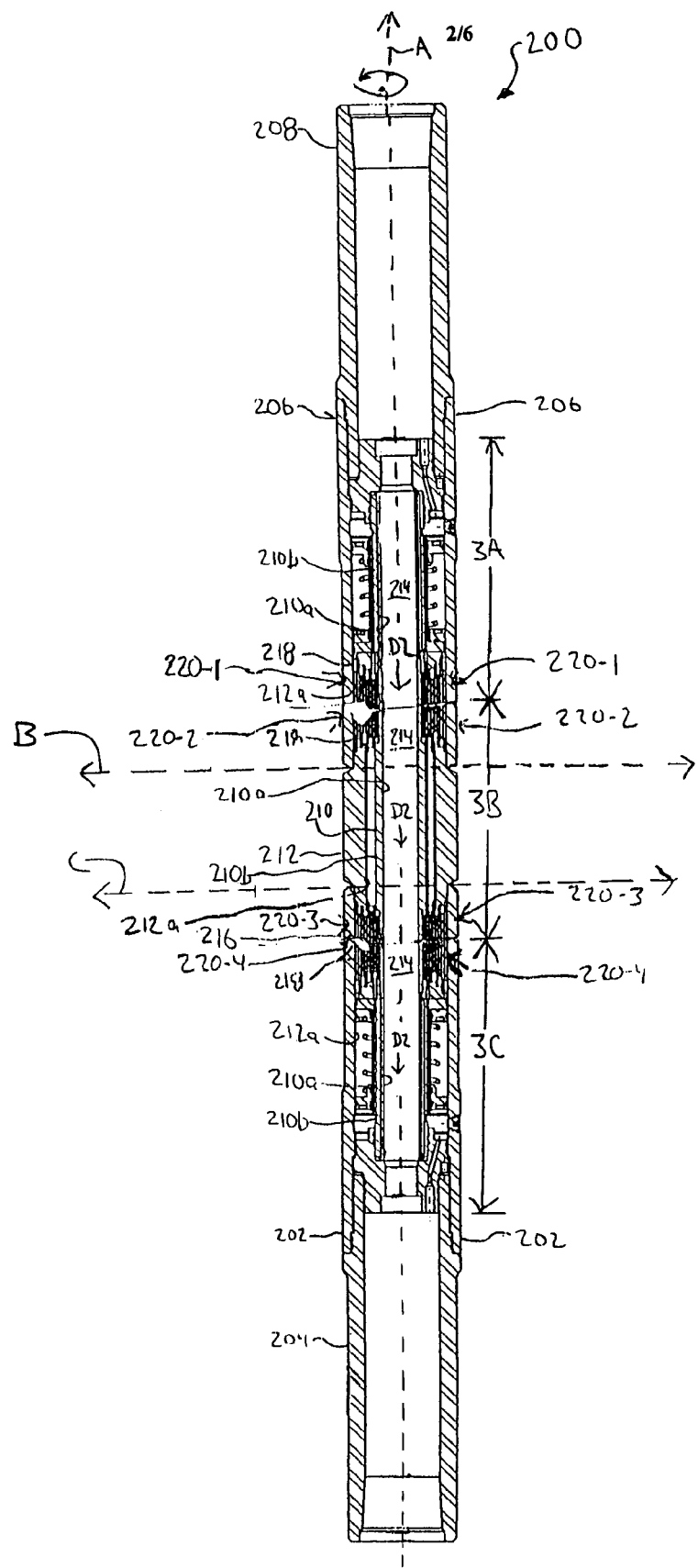
FIG. 2 is a cross-sectional view of a selected section of the drill string of FIG. 1 which includes a low frequency acoustic attenuator constructed in accordance with the invention.

Referring next to FIG. 2, the configuration of a low frequency acoustic attenuator 200 constructed in accordance with the teachings of the present invention will now be described in greater detail. The low frequency acoustic attenuator 200 was developed based upon observations made during testing and completion tests performed using the acoustic telemetry (ATS™) system of Halliburton Energy Services of Houston, Tex. In these tests, it was observed that some of the testing and well completion tools attenuated the acoustic telemetry signals to as much as 40 dB with several tens of feet from the transmitter and, as a result, disrupted the communication. Further analysis revealed that the use of plural sliding sleeves with alternating sub-chambers filled with attenuative fluids such as oil and compressed nitrogen tended to attenuate signals in a frequency bandwidth generally extending from about 300 Hz to about 2 kHz.

Based upon the foregoing discovery, the low frequency acoustic attenuator 200 subject of the present application was developed and configured to attenuate low frequency signals. Generally, the low frequency acoustic attenuator 200 is suitable for attenuating signals below 5 kHz. The preferred frequency band for attenuation of low frequency signals is a frequency range extending from about 300 Hz to about 2 kHz, a frequency range which is hereby defined as a low frequency range. The foregoing frequency range is of interest since it corresponds to LAT's band of operation. Also, within the aforementioned low frequency range are signals originating from the drill bit and mud motor, two key sources of noise which could adversely affect the transmission of data along an acoustic data channel, for example, the acoustic data channel 164 of the drill string 126. In this regard, it should be noted that each of the low frequency acoustic attenuators 130', 138, 146 and 154 previously identified as forming part of the drill string 126 of FIG. 1 is similarly configured to the low frequency acoustic attenuator 200 illustrated in FIG. 2 and that the specific functions previously associated with particular ones of the low frequency acoustic attenuators 130', 138, 146 and 154 which may be performed by the low frequency acoustic attenuator 200 will vary depending on where, within a drill string, for example, the drill string 126, the low frequency acoustic attenuator 200 is coupled or otherwise located. It should also be noted that, as illustrated in FIG. 2, the low frequency acoustic attenuator 200 includes any number of components not directly associated with the attenuation of acoustic energy and that, for ease of clarity and description, any such components not directly associated with the attenuation of acoustic energy will be omitted from the description that follows. Finally, while, in the embodiment disclosed herein, the low frequency acoustic attenuator 200 is disclosed in connection with an application of LWD acoustic telemetry to the drill string 126, it should be clearly understood that it is specifically contemplated that the low frequency acoustic attenuator may be useful in other applications, for example, other acoustic telemetry applications requiring terminators, look ahead of bit acoustic ranging measurements, acoustic logging and LWD tools.

As may be seen in the cross-sectional view shown in FIG. 2, the low frequency acoustic attenuator 200 is a generally tubular section of drill pipe coupled, on opposite ends thereof, to other sections of a drill string such as the drill string 126. For example, in FIG. 2, a lower end 202 of the low frequency acoustic attenuator 200 is coupled to drill string section 204 while an upper end 206 of the low frequency acoustic attenuator 200 is coupled to drill string section 208. It is contemplated that the drill string sections 204 and 208 may be any of the various types of drill string sections, for example, a drill bit, a section of drill pipe, a downhole transceiver, an acoustic transceiver, a surface transceiver or a low frequency acoustic attenuator, all of which were previously identified as forming part of the drill string 126. In the alternative, of course, the drill string sections 204 and 208 may be types of drill string sections other than those specifically recited herein.

Preferably, the generally tubular-shaped low frequency acoustic attenuator 200 is aligned around an imaginary vertical axis A (drawn in phantom in FIG. 2) located in the general center of the low frequency acoustic attenuator 200. As disclosed herein, the low frequency acoustic attenuator 200 is configured to include a generally tubular inner housing 210 and a generally tubular outer housing 212, both of which are formed of an acoustically conductive material and, like the low frequency acoustic attenuator 200 in its entirety, are generally aligned around the centrally located vertical axis A. Drilling mud being pumped into the borehole 160 flows downwardly through an interior chamber 214 chamber defined by an inner side surface 210a of the inner housing 210 in direction D2 for subsequent entry into the borehole 160 in the manner previously described with respect to FIG. 1. Similarly, the outer housing 212 has an inner side surface 212a which partially defines an interior chamber 216. Here, however, the interior chamber 216 is further defined by an outer side surface 210b of the inner housing 210. It should be noted that, due to dimensional limitations in FIG. 2, the boundaries of the interior chamber 216 cannot be clearly seen in this figure. However, as will be more fully described below with respect to FIGS. 3A–C, supportably mounted within the interior chamber 216 are one or more dampening members 218, each preferably shaped to resemble a generally cylindrical sleeve, for acoustically attenuating low frequency acoustic energy propagating through the low frequency acoustic attenuator 200.

Each dampening member 218 includes a first, generally circular, end both physically and acoustically coupled to either the inner housing 210 or the outer housing 212. From the generally circular first end, each dampening member 218 longitudinally extends in a direction generally aligned with the centrally located vertical axis A until terminating in a second, generally circular, end, thereby yielding the generally cylindrical, sleeve-like shape of the dampening members 218. Because it terminates within the interior chamber 216 and is capable of movement therewithin, the second end of each dampening member 218 is termed a "free" end. As will also be more fully described below with respect to FIGS. 3A–C, the interior chamber 216 is effectively divided into one or more sub-chambers, each filled with a fluid capable of dissipating acoustic energy as heat. As a result, instead of being propagated along the inner or outer housings 212 or 214 to adjacent sections 204 or 208 of the drilling string, acoustic energy propagates onto the dampening members 218 where, because of the allowable range of movement, within the interior chamber 216, permitted by the free ends of the dampening members 218, the acoustic energy is first converted into mechanical energy resulting in movement of the dampening members 218 and subsequently dissipated into the fluid-filled sub-chambers as heat.

While, in foregoing description, it is contemplated that the dampening members 218 may be exclusively coupled to the inner housing 210 or to the outer housing 212, in order to enhance the amount of acoustical energy attenuated thereby, it is preferred that the dampening members 218 include at least one dampening member coupled to the inner housing 210 and at least one dampening member coupled to the outer housing 212. Further, while it is contemplated that the dampening members 218 may be positioned in a variety of orientations relative to the other components of the low frequency acoustic attenuator 200, in most applications, the dampening members 218 would be positioned such that, like the inner and outer housings 210 and 212, the dampening members 218 are generally aligned around the centrally located vertical axis A. In the foregoing alignment, the dampening members 218 would be in a position best suited for attenuating compressional waves. By aligning the dampening members 218 in other positions, however, the dampening members 218 may be used to attenuate torsional waves.

To further enhance the amount of acoustical energy attenuated by the low frequency acoustic attenuator 200, it is further preferred that the dampening members 218 are configured to include one or more series of nested dampening members 218. For example, in the embodiment of the invention shown in FIG. 2, the low frequency acoustic attenuator 200 includes first, second, third and fourth series 220-1, 220-2, 220-3 and 220-4 of nested dampening members 218. Of course, the foregoing disclosure of the low frequency acoustic attenuator 200 as having four series of nested dampening members 218 is purely exemplary and it is fully contemplated that the low frequency acoustic attenuator 200 may instead include any number of series of nested dampening members 218. As described and illustrated herein, a series of dampening members 218 are considered to be nested when they are arranged such that all but a first dampening member of the series encircle encircles the preceding one of the series. For example, if the dampening members 218 are, as previously set forth, configured as generally cylindrical sleeves which, like the inner housing 210, are aligned around the centrally located vertical axis A, a first one of a series of nested dampening members would encircle a portion of the inner housing 210, a second one of the series of nested dampening members would encircle all, or part of, the longitudinally extending portion of the first dampening member, a third one of the series of nested dampening members would encircle all, or part of, the longitudinally extending portion of the second dampening member and so on. As will be more fully appreciated with respect to FIGS. 3A–C, the series 220-1, 220-2, 220-3 and 220-4 of nested dampening members 218 contribute to the portioning of the interior chamber 216 into sub-chambers. Of course, if the dampening members 218 are not aligned with the centrally located vertical axis A, for example, if the dampening members 218 are positioned to attenuate torsional waves, the series of dampening members 218 may still be nested. In this configuration, the first one of the series of dampening members 218 would no longer encircle a portion of the inner housing 210. The relationship of the subsequent dampening members 218 would, however, be as previously set forth.

To still further enhance the amount of acoustical energy attenuated by the low frequency acoustical attenuator 200, it is still further preferred that pairs of the series of nested dampening members 218 are interdigitated with one another. For example, in the embodiment of the invention illustrated in FIG. 2, the series 220-1 of nested dampening members 218 is interdigitated with the series 220-2 of nested dampening members while the series 220-3 of nested dampening members 218 is interdigitated with the series 220-4 of nested dampening members 218. Of course, the foregoing disclosure of the low frequency acoustic attenuator 200 as having a first pair 220-1 and 220-2 and a second pair 220-3 and 220-4 of interdigitated series of nested dampening members 218 is purely exemplary and it is fully contemplated that the low frequency acoustic attenuator 200 may instead include any number of pairs of interdigitated series of nested dampening members 218. As described and illustrated herein, a pair of series of nested dampening members 218 are considered to be interdigitated when they are arranged such that: (1) a first series of the pair of series of nested dampening members laterally extends in a first direction generally aligned with the centrally located vertical axis A; (2) a second series of the pair of series of nested dampening members laterally extends in a second direction generally aligned with the centrally located vertical axis A and opposite to the first direction; and (3) the second series of nested dampening members are laterally offset a specified distance relative to the first series of nested dampening members such that the second, free, end of a first dampening member of the second series of nested dampening members is positioned equidistant between and longitudinally extends beyond the free ends of first and second dampening members of the first series of nested dampening members, the second, free, end of a second dampening member of the second series of nested dampening members is positioned equidistant between and longitudinally extends beyond the free ends of second and third dampening members of the first series of nested dampening members, etc.

Finally, to even still further enhance the amount of acoustical energy attenuated by the low frequency acoustic attenuator 200, a number of impedance mismatches are formed at specified locations along the inner or outer housings 210, 212 of the low frequency acoustic attenuator 200. While it is contemplated that impedance mismatches may be formed at the specified locations by a variety of techniques, one suitable technique would be to vary the radial dimension of the inner or outer housing 210, 212. For example, in FIG. 2, the outer housing 212 has a first impedance mismatches along radial axis B and a second impedance mismatch along radial axis C. Upon encountering an impedance mismatch, acoustic energy propagating along a respective one of the inner or outer housings 212 and 214 is reflected. A portion of the reflected acoustic energy subsequently propagates onto one of the dampening members 218 where it is dissipated in the manner previously set forth.

Furthermore, the first and second impedance mismatches respectively located along the radial axis B and the radial axis C collectively function as an acoustic energy trap which would prevent acoustic energy from continuing to propagate along the low frequency acoustic attenuator until the acoustic energy is fully attenuated by the various dampening members 218 forming part of the low frequency acoustic attenuator 200. For example, in the discussion which follows, the path of acoustic energy through the low frequency acoustic attenuator 200 is set forth in greater detail. As part of that discussion, it is stated that the first impedance mismatch located long the radial axis B will cause acoustic energy propagating along path 340 to be reflected onto path 342 such that a first portion of the reflected acoustic energy will propagate along the dampening members 314*a* through 314*d* for dissipation thereby. It should be appreciated that, upon encountering the first impedance mismatch, a second portion of the reflected acoustic energy will continue propagating through the low frequency acoustic attenuator 200, for example, along path 344. A portion of the acoustic energy which continues to propagate through the low frequency acoustic attenuator 200, for example, along path 344, will subsequently propagate onto the dampening members 318*a* through 318*d* for dissipation thereby. However, by providing a second impedance mismatch, here, the mismatch located along the radial axis C, that portion of the acoustic energy not dissipated by the dampening members 318*a* through 318*d* would again be reflected, this time, in a direction back towards the first impedance mismatch. It is contemplated, therefore, that a significant amount of acoustic energy may, in effect, be trapped between the first and second impedance mismatches until dissipated, typically, by either the dampening members 304*a* through 304*d* or the dampening members 318*a* through 318*d*.

Figure 3A:
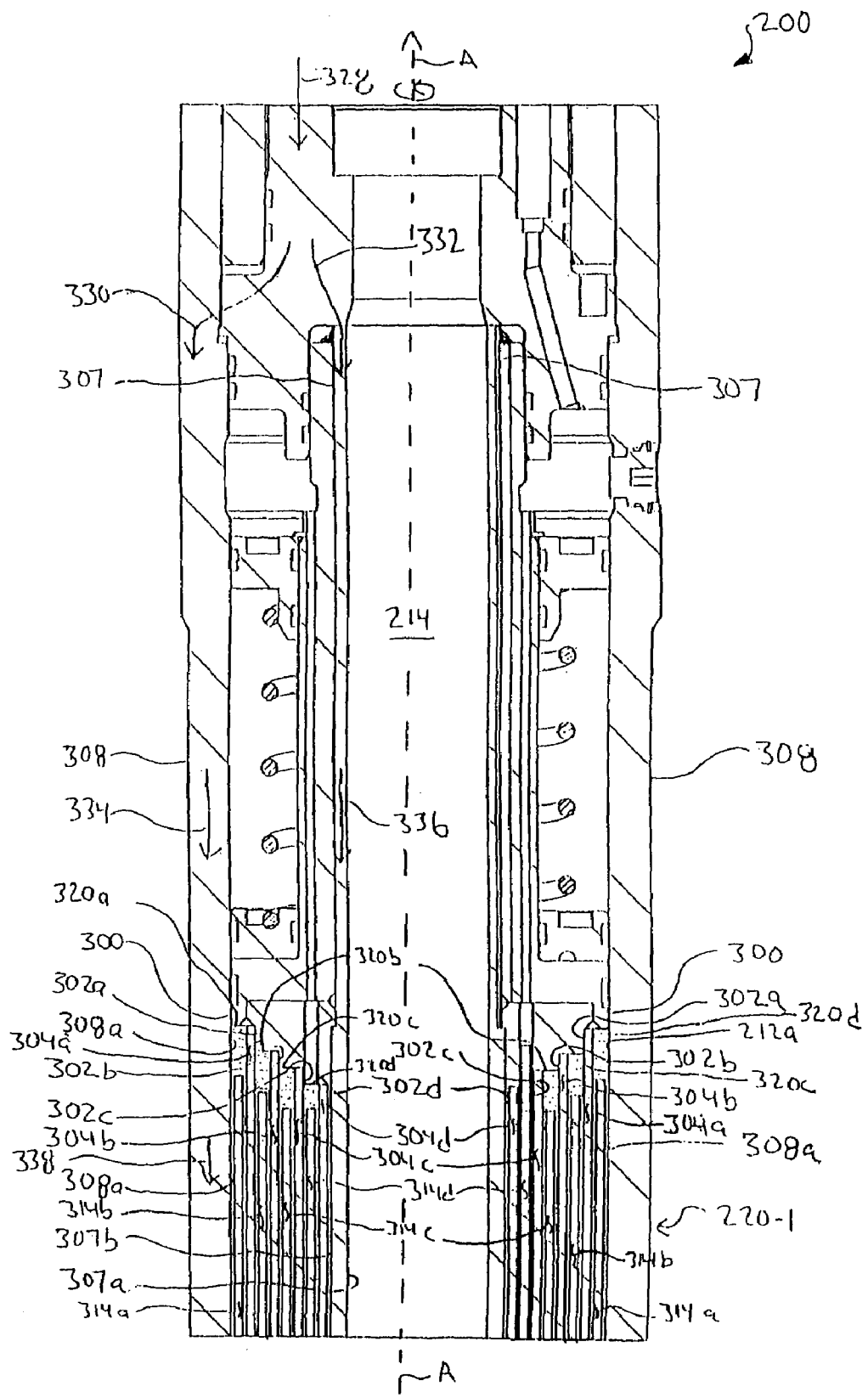
FIG. 3A is an expanded view of a first portion of the low frequency acoustic attenuator of FIG. 2.
Figure 3B:
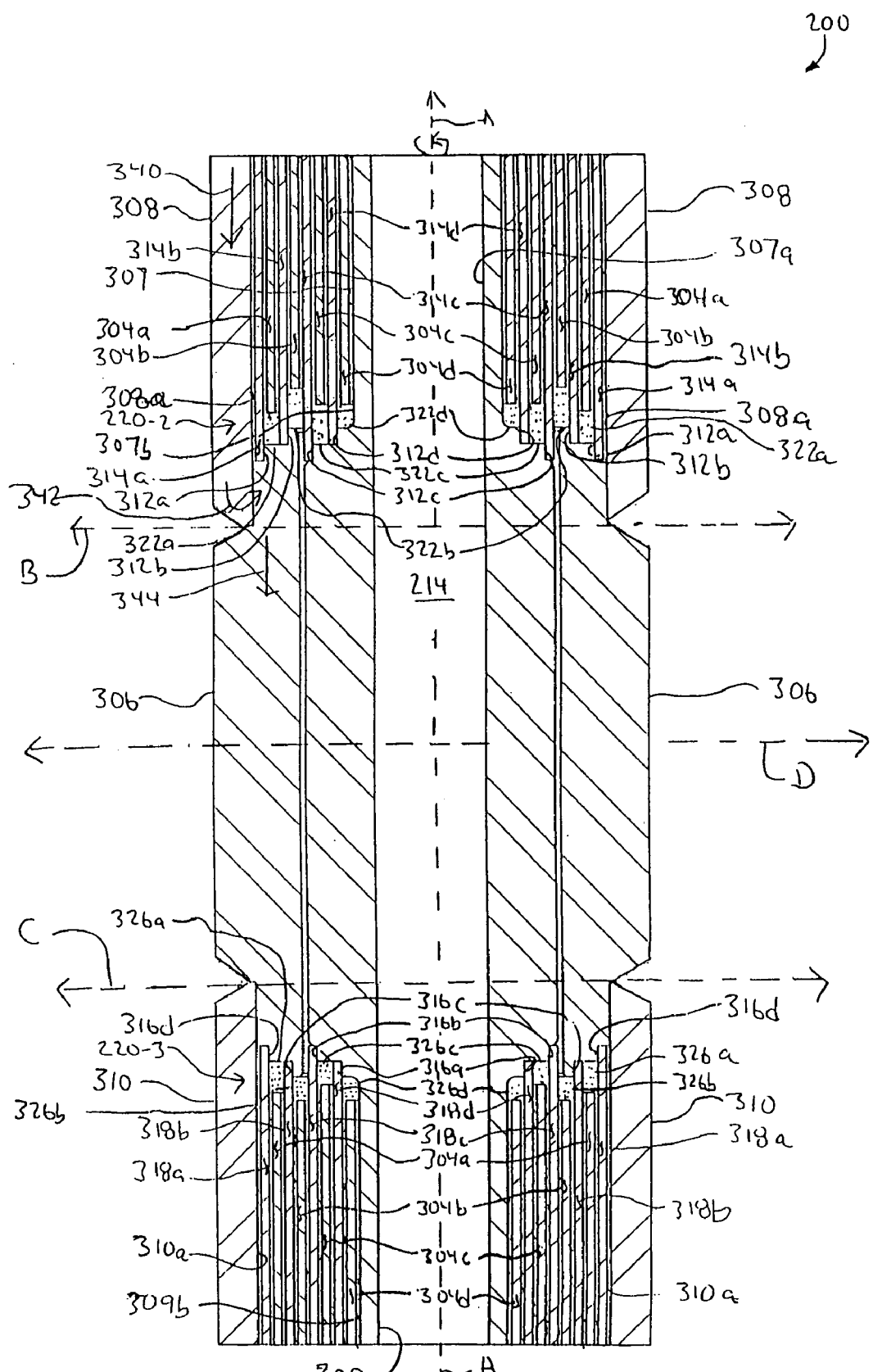
FIG. 3B is an expanded view of a second portion of the low frequency acoustic attenuator of FIG. 2.
Figure 3C:
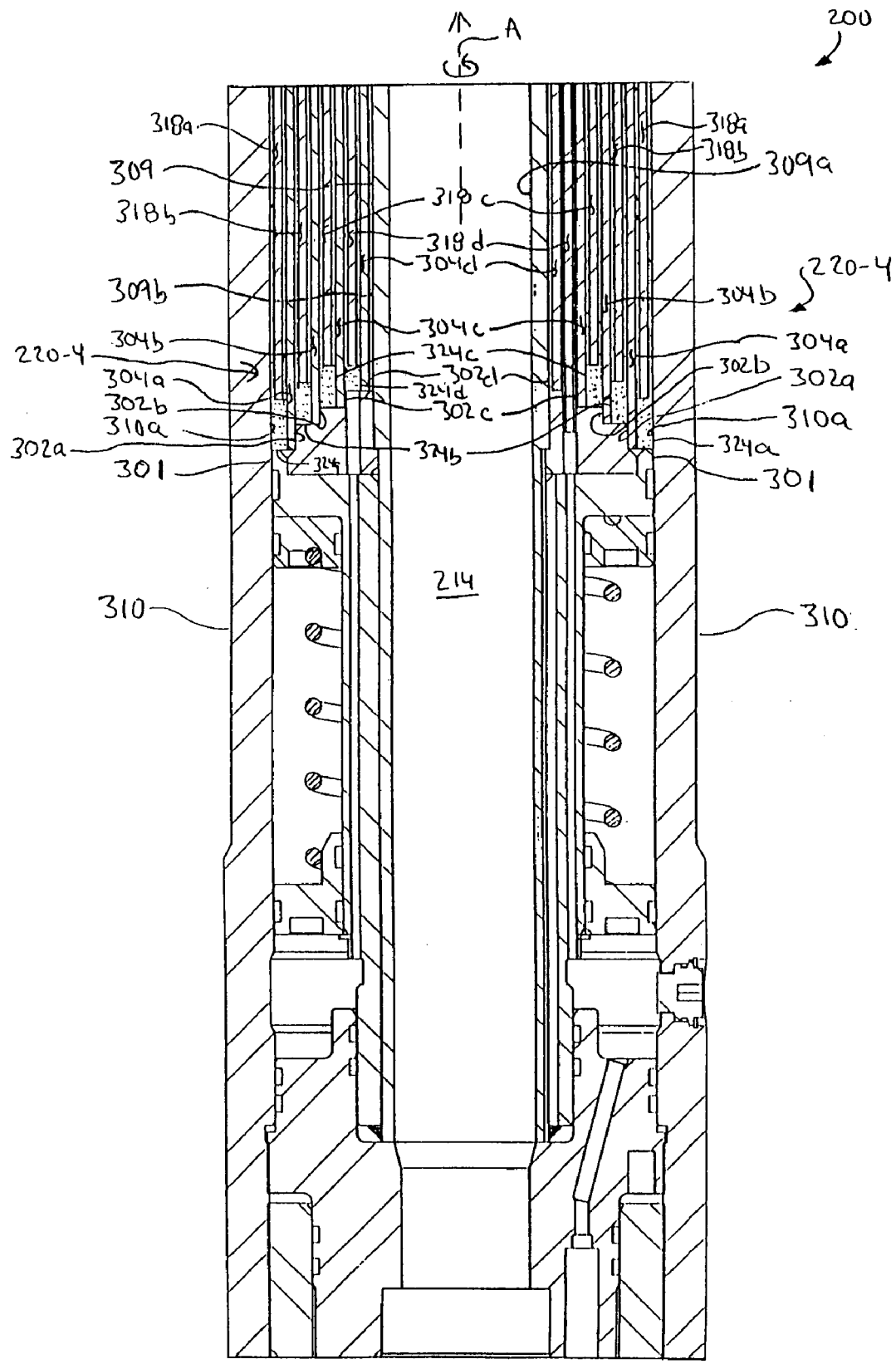
FIG. 3C is an expanded view of a third portion of the low frequency acoustic attenuator of FIG. 2.

Referring next to FIGS. 3A–C, the structure of the low frequency acoustic attenuator 200, as well as the propagation of acoustic energy therethrough, will now be described in greater detail. In the description which follows, it will be presumed that acoustic energy originating within the section 208 of drill string located above the low frequency acoustic attenuator 200 is attempting to propagate to the section 204 of drill string located below the low frequency acoustic attenuator 200. Such a situation is similar to that which occurs when the low frequency acoustic attenuator 200 is deployed, as the upper terminator 166', to protect the surface transceiver 132 of the drill string 126 from noise generated by the top drive 115 (or other mechanized system) responsible for vertical movement of the drill string 126.

As previously set forth, in its broadest sense, the low frequency acoustic attenuator 200 includes a generally tubular inner housing 210 which defines an interior chamber within which a flow of drilling mud is contained and a generally tubular outer housing 212 which, in combination with the generally tubular inner housing 210, defines an interior chamber within which one or more dampening members is positioned. It should be readily appreciated by one skilled in the art that such a low frequency acoustic attenuator may be embodied in a variety of configurations, one of which is disclosed herein by way of example. As may now be seen, the embodiment of the low frequency acoustic attenuator 200 disclosed herein by way of example is comprised of an intermediate body portion 306 to which an upper body portion 308 and a lower body portion 310 are coupled. Between the general vicinity of the lateral axis B and the general vicinity of the lateral axis C, the intermediate body portion 306 serves as both the inner and outer housings 210 and 212 of the low frequency acoustic attenuator 200 and, as a result, no dampening members are positioned between the lateral axis B and the lateral axis C. Above the lateral axis B, however, the intermediate body portion 306 includes a first projecting member 307 which serves as the inner housing 210 for the low frequency attenuator 200 while the upper body portion 308 serves as the outer housing 212 for the low frequency acoustic attenuator 200. Similarly, below the lateral axis C, the intermediate body portion 306 includes a second projecting member 309 which serves as the inner housing 210 for the low frequency acoustic attenuator 200 while the lower body portion 310 serves as the outer housing 212 for the low frequency acoustic attenuator 200. Accordingly, and as will be more fully described below, one or more dampening members are positioned between the upper body portion 308 and the first projecting member 307 of the intermediate body portion 306 as well as between the lower body portion 310 and the second projecting member 309 of the intermediate body portion 306.

In addition to the intermediate body portion 306, the upper body portion 308 and the lower body portion 310, the low frequency acoustic attenuator 200 further includes a first support member 300 which couples the upper body portion 308 to the first projecting member 307 of the intermediate body portion 306 and a second support member 301 which couples the lower body portion 310 to the second projecting member 309 of the intermediate body portion 306. It is contemplated that the illustrated shape and/or dimensions of the first and second support members 300 and 301 may be readily varied without significantly affecting the functions to be served by the support members 300, 301 in support of the attenuation of acoustic energy propagating through the low frequency acoustic attenuator 200. It is further contemplated that, in addition to the functions described herein, the first and second support members 300 and 301 may, if desired, serve other functions unrelated to the attenuation of acoustic energy within the low frequency acoustic attenuator 200. Any such other functions would be beyond the scope of the present application and need not, therefore, be described in further detail herein.

As may be best seen in FIGS. 3A and 3C, with respect to the attenuation of acoustic energy within the low frequency acoustic attenuator 200, the first support member 300 is coupled, on opposite sides thereof, to the first projecting member 307 of the intermediate body portion 306 and to the upper body portion 308. Similarly, the second support member 301 is coupled, on opposite sides thereof, to the second projecting member 309 of the intermediate body portion 306 and to the lower body portion 310. In addition to laterally extending between the projecting members 307, 309 of the intermediate body portion 306 and the upper and lower body portions 308, 310, the support members 300, 301, each include a series of longitudinally extending faces 302a, 302b, 302c and 302d, to which a first end of a corresponding one of the dampening members 218, now identified as dampening members 304a, 304b, 304c and 304d, respectively, is threadingly engaged. Of course, the dampening members 304a, 304b, 304c and 304d may be secured to the corresponding one of the longitudinally extending faces 302a, 302b, 302c and 302d using a variety of other techniques as well. From the first ends threadingly secured to the faces 302a, 302b, 302c and 302d, respectively, the generally cylindrical dampening members 304a, 304b, 304c and 304d longitudinally extend in a first direction generally aligned with the centrally located vertical axis A. For the support member 300 shown in FIG. 3A, the generally cylindrical dampening members 304a through 304d collectively form the first series 220-1 of dampening members and the first direction is a downwardly direction while, for the support member 301 shown in FIG. 3C, the generally cylindrical dampening members 304a through 304d collectively form the fourth series 220-4 of dampening members and the first direction is an upwardly direction.

For the first series 220-1 of dampening members, the generally cylindrical dampening members 304a, 304b, 304c and 304d are arranged in a nested configuration in which dampening member 304a is spaced a specified distance apart from an inner side surface 308a of the upper body portion 308, the dampening member 304b is spaced a specified distance apart from the dampening member 304a, the dampening member 304c is spaced a specified distance apart from the dampening member 304b, the dampening member 304d is spaced a specified distance apart from the dampening member 304c and an outer side surface 307b of the first projecting member 307 of the intermediate body portion 306 is spaced a specified distance apart from the dampening member 304d. Similarly, for the fourth series 220-4 of dampening members, the generally cylindrical dampening members 304a, 304b, 304c and 304d are arranged in a nested configuration in which dampening member 304a is spaced a specified distance apart from an inner side surface 310a of the lower body portion 310, the dampening member 304b is spaced a specified distance apart from the dampening member 304a, the dampening member 304c is spaced a specified distance apart from the dampening member 304b, the dampening member 304d is spaced a specified distance apart from the dampening member 304c and an outer side surface 309b of the second projecting member 309 of the intermediate body portion 306 is spaced a specified distance apart from the dampening member 304d.

Of course, it should be clearly understood that the foregoing disclosure of four dampening members being positioned, in a nested configuration, between the outer side surface 307b of the first projecting member 307 of the intermediate body portion 306 and the inner side surface 308a of the upper body portion 308 or between the outer side surface 309b of the second projecting member 309 of the intermediate body portion 306 and the inner side surface 310a of the lower body portion 310 is purely exemplary and it is fully contemplated that, depending on the available space between the aforementioned side surfaces, the width of the dampening members and the desired spacing between successive dampening members, various numbers of dampening members may instead be positioned between the outer side surface 307b of the first projecting member 307 of the intermediate body portion 306 and the inner side surface 308a of the upper body portion 308 or between the outer side surface 309b of the second projecting member 309 of the intermediate body portion 306 and the inner side surface 310a of the lower body portion 310. Further, while, in one embodiment of the invention, it is contemplated that the specified distance separating the inner side surface 308a, 310a of the upper and lower body portions 308, 310, respectively, from the first dampening member 304a, the first dampening member 304a from the second dampening member 304b, the second dampening member 304b from the third dampening member 304c, the third dampening member 304c from the fourth dampening member 304d and the fourth dampening member 304d from the inner side surface 307a, 309a of the first and second projecting members 307, 309 of the intermediate body portion 306, are generally the same distance, it is fully contemplated that, in further embodiments, one or more of the specified distances may differ from one or more of the other distances.

Turning momentarily to FIG. 3B, formed along an upper end of the intermediate body portion 306 and located immediately above the lateral axis B are a first series of longitudinally extending faces 312a, 312b, 312c and 312d, to which a first end of a corresponding one of the generally cylindrical dampening members 218, now identified as dampening members 314a, 314b, 314c and 314d, respectively, is threadingly engaged. Similarly, formed along a lower end of the intermediate body portion 306 and located immediately below the lateral axis C are a second series of longitudinally extending faces 316a, 316b, 316c and 316d, to which a first end of a corresponding one of the generally cylindrical dampening members 218, now identified as dampening members 318a, 318b, 318c and 318d, respectively, is threadingly engaged. Of course, the dampening members 314a, 314b, 314c, 314d, 318a, 318b, 318c and 318d may be secured to the corresponding one of the longitudinally extending faces 312a, 312b, 312c, 312d, 316a, 316b, 316c and 316d using a variety of other techniques as well. From the first ends threadingly secured to the faces 312a, 312b, 312c, 312d, 316a, 316b, 316c and 316d, respectively, the generally cylindrical dampening members 314a, 314b, 314c, 314d, 318a, 318b, 318c and 318d longitudinally extend in a second direction generally aligned with the central axis A. For the upper end of the intermediate body portion 306, the generally cylindrical dampening members 314a through 314d collectively form the second series 220-2 of dampening members and the second direction is an upwardly direction while, for the lower end of the intermediate body portion 306, the generally cylindrical dampening members 318a through 318d collectively form the third series 220-3 of dampening members and the second direction is a downwardly direction.

For the second series 220-2 of dampening members, the generally cylindrical dampening members 314a, 314b, 314c and 314d are arranged in a nested configuration in which dampening member 314a is spaced a specified distance apart from the inner side surface 308a of the upper body portion 308, the dampening member 304b is spaced a specified distance apart from the dampening member 304a, the dampening member 304c is spaced a specified distance apart from the dampening member 304b, the dampening member 304d is spaced a specified distance apart from the dampening member 304c and the outer side surface 307b of the first projecting member 307 of the intermediate body portion 306 is spaced a specified distance apart from the dampening member 304d. Similarly, for the third series 220-3 of dampening members, the generally cylindrical dampening members 318a, 318b, 318c and 318d are arranged in a nested configuration in which dampening member 318a is spaced a specified distance apart from the inner side surface 310a of the lower body portion 310, the dampening member 318b is spaced a specified distance apart from the dampening member 318a, the dampening member 318c is spaced a specified distance apart from the dampening member 318b, the dampening member 318d is spaced a specified distance apart from the dampening member 318c and the outer side surface 309b of the second projecting member 309 of the intermediate body portion 306 is spaced a specified distance apart from the dampening member 318d.

Referring next, in combination, to FIGS. 3A and 3B, the interdigitation of the first series 220-1 of nested dampening members 304a through 304d and the second series 220-2 of nested dampening members 314a through 314d will now be described in greater detail. As may now be seen, the series 220-1 of nested generally cylindrical dampening members 304a through 304d downwardly extend from the first ends threadingly secured to the longitudinally extending faces 302a, 302b, 302c and 302d in a direction generally aligned with the centrally located vertical axis A until terminating in the second or free end which, as previously set forth, is capable of movement in response to the propagation of acoustic energy therealong. Generally, the length of each one of the generally cylindrical dampening members of the series 220-1 is longitudinally foreshortened relative to the succeeding dampening member outwardly positioned relative thereto. Accordingly, the outermost one (304a) of the series 220-1 of nested dampening members has the greatest length while the innermost one (304d) of the series 220-1 of nested dampening members has the shortest length with the intermediate ones (304b and 304c) having the second longest length and the second shortest length, respectively.

Longitudinal foreshortening of the series 220-1 may be achieved by either longitudinally staggering the faces 302a through 302d such that the face 302a has an uppermost position, the face 302b has a second uppermost position, the face 302d has a lowermost position and the face 302c has a second lowermost position among the faces 302a through 302d alone or by combining the aforementioned longitudinal staggering of the faces 302a through 302d with varying the respective lengths of the dampening members 304a through 304d. Similarly, the length of each one of the generally cylindrical dampening members of the series 220-2 is longitudinally foreshortened relative to the succeeding dampening member outwardly positioned relative thereto. Accordingly, the outermost one (314a) of the series 220-2 of nested dampening members has the greatest length while the innermost one (314d) of the series 220-2 of nested dampening members has the shortest length with the intermediate ones (314b and 314c) having the second longest length and the second shortest length, respectively. Longitudinal foreshortening of the dampening members 314a through 314d forming the series 220-2 is achieved using the same techniques to longitudinally foreshorten the dampening members 304a through 304d of the series 220-1.

To interdigitate the series 220-1 of nested dampening members 304a through 304d with the series 220-2 of nested dampening members 314a through 314d, a first one of the series 220-1, 220-2 of nested dampening members is laterally shifted relative to the other one of the series 220-1, 220-2 of nested dampening members. For example, in the embodiment illustrated in FIGS. 3A and 3B, the series 220-2 of nested dampening members is laterally shifted outwardly relative to the series 220-1 of nested dampening members. It is contemplated that the desired lateral shift may be accomplished using a variety of techniques. For example, the intermediate body portion 306 may be shaped such that each one of the longitudinally extending faces 312a through 312*d* is laterally shifted outwardly relative to the corresponding one of the longitudinally extending faces 302*a* through 302*d*. By laterally shifting outwardly the series 220-2 of nested dampening members relative to the series 220-1 of nested dampening members, the free end of the dampening member 304*a* is positioned between the dampening members 314*a* and 314*b*, the free end of the dampening member 304*b* is positioned between the dampening members 314*b* and 314*c*, the free end of the dampening member 304*c* is positioned between the dampening members 314*c* and 314*d*, the free end of the dampening member 304*d* is positioned between the dampening member 314*d* and the outer side surface 307*b* of the first projecting member 307 of the intermediate body portion 306, the free end of the dampening member 314*a* is positioned between the inner side surface 308*a* of the upper body portion 308 and the dampening member 304*a*, the free end of the dampening member 314*b* is positioned between the dampening members 304*a* and 304*b*, the free end of the dampening member 314*c* is positioned between the dampening members 304*b* and 304*c* and the free end of the dampening member 314*d* is positioned between the dampening members 304*c* and 304*d*.

As previously set forth, the interior chamber 216 generally defined by the outer side surface 307*b* of the first projecting member of the intermediate body portion 306 and the inner side surface 308*a* of the upper body portion 308 is effectively divided into plural sub-chambers, in each of which, a free end of a dampening member is positioned. More specifically, the sub-chamber 320*a* is defined by the inner side surface 308*a* of the upper body portion 308 and the dampening member 304*a* and has the free end of the dampening member 314*a* positioned therein, the sub-chamber 320*b* is defined by the dampening member 304*a* and the dampening member 304*b* and has the free end of the dampening member 314*b* positioned therein, the sub-chamber 320*c* is defined by the dampening member 304*b* and the dampening member 304*c* and has the free end of the dampening member 314*c* positioned therein, the sub-chamber 320*d* is defined by the dampening member 304*c* and the dampening member 304*d* and has the free end of the dampening member 314*d* positioned therein, the sub-chamber 322*a* is defined by the dampening member 314*a* and the dampening member 314*b* and has the free end of the dampening member 304*a* positioned therein, the sub-chamber 322*b* is defined by the dampening member 314*b* and the dampening member 314*c* and has the free end of the dampening member 304*b* positioned therein, the sub-chamber 322*c* is defined by the dampening member 314*c* and the dampening member 314*c* and has the free end of the dampening member 304*c* positioned therein and the sub-chamber 322*d* is defined by the dampening member 314*d* and the outer side surface 307*b* of the first projecting member 307 of the intermediate body portion 306 and has the free end of the dampening member 304*d* positioned therein.

The plural sub-chambers 320*a* through 320*d* and 322*a* through 322*d* are coupled to one another by fluid passages located between successive ones of the generally cylindrical dampening members 304*a* through 304*d* and 314*a* through 314*d*. For example, the sub-chamber 320*a* is coupled to the sub-chamber 322*a* by a fluid passage located between the dampening member 314*a* and the dampening member 304*a*. In turn the sub-chamber 320*a* is coupled to the sub-chamber 320*b* by a fluid passage located between the dampening member 304*a* and the dampening member 314*b*. Each of the plural sub-chambers 320*a* through 320*d* and 322*a* through 322*d* is filled with an attenuative fluid capable of dissipating acoustic energy as heat. For example, the plural sub-chambers 320*a* through 320*d* and 322*a* through 322*d* may all be filled with a pressure balanced viscous fluid such as oil or pressurized nitrogen.

To interdigitate the series 220-4 of nested dampening members 304*a* through 304*d* with the series 220-3 of nested dampening members 318*a* through 318*d*, a first one of the series 220-4, 220-3 of nested dampening members is laterally shifted relative to the other one of the series 220-4, 220-3 of nested dampening members. For example, in the embodiment illustrated in FIGS. 3B and 3C, the series 220-3 of nested dampening members is laterally shifted outwardly relative to the series 220-4 of nested dampening members. It is contemplated that the desired lateral shift may be accomplished using any of the techniques previously described with respect to the series 220-1 and 220-2 of nested dampening members. By laterally shifting outwardly the series 220-3 of nested dampening members relative to the series 220-4 of nested dampening members, the free end of the dampening member 304*a* is positioned between the dampening members 318*a* and 318*b*, the free end of the dampening member 304*b* is positioned between the dampening members 318*b* and 318*c*, the free end of the dampening member 304*c* is positioned between the dampening members 318*c* and 318*d*, the free end of the dampening member 304*d* is positioned between the dampening member 318*d* and the outer side surface 309*b* of the second projecting member 309 of the intermediate body portion 306, the free end of the dampening member 318*a* is positioned between the inner side surface 310*a* of the lower body portion 310 and the dampening member 304*a*, the free end of the dampening member 318*b* is positioned between the dampening members 304*a* and 304*b*, the free end of the dampening member 318*c* is positioned between the dampening members 304*b* and 304*c* and the free end of the dampening member 318*d* is positioned between the dampening members 304*c* and 304*d*.

As previously set forth, the portion of the interior chamber 216 generally defined by the outer side surface 309*b* of the first projecting member of the intermediate body portion 306 and the inner side surface 310*a* of the lower body portion 310 is effectively divided into plural sub-chambers, in each of which, a free end of a dampening member is positioned. More specifically, the sub-chamber 324*a* is defined by the inner side surface 310*a* of the lower body portion 310 and the dampening member 304*a* and has the free end of the dampening member 318*a* positioned therein, the sub-chamber 324*b* is defined by the dampening member 304*a* and the dampening member 304*b* and has the free end of the dampening member 318*b* positioned therein, the sub-chamber 324*c* is defined by the dampening member 304*b* and the dampening member 304*c* and has the free end of the dampening member 318*c* positioned therein, the sub-chamber 324*d* is defined by the dampening member 304*c* and the dampening member 304*d* and has the free end of the dampening member 314*d* positioned therein, the sub-chamber 326*a* is defined by the dampening member 318*a* and the dampening member 318*b* and has the free end of the dampening member 304*a* positioned therein, the sub-chamber 326*b* is defined by the dampening member 318*b* and the dampening member 318*c* and has the free end of the dampening member 304*b* positioned therein, the sub-chamber 326*c* is defined by the dampening member 318*c* and the dampening member 318*c* and has the free end of the dampening member 304*c* positioned therein and the sub-chamber 326*d* is defined by the dampening member 318*d* and the outer side surface 309b of the second projecting member 309 of the intermediate body portion 306 and has the free end of the dampening member 304d positioned therein.

The plural sub-chambers 324a through 324d and 326a through 326d are coupled to one another by fluid passages located between successive ones of the generally cylindrical dampening members 304a through 304d and 318a through 318d. For example, the sub-chamber 324a is coupled to the sub-chamber 326a by a fluid passage located between the dampening member 318a and the dampening member 304a. In turn the sub-chamber 326a is coupled to the sub-chamber 320b by a fluid passage located between the dampening member 304a and the dampening member 314b. As before, the plural sub-chambers 324a through 324d and 326a through 326d are all filled with filled with a pressure balanced viscous fluid such as oil, pressurized nitrogen, or another suitable attenuative fluid capable of dissipating acoustic energy as heat.

Referring again to FIG. 3A, the flow of acoustic energy through the low frequency acoustic attenuator 200 will now be described in greater detail. As previously set forth, it is presumed that acoustic energy originating within the section 208 of drill string located above the low frequency acoustic attenuator 200 is attempting to propagate, through the low frequency acoustic attenuator 200, to the section 204 of drill string located below the low frequency acoustic attenuator 200. Acoustic energy entering the low frequency acoustic attenuator 200 along path 328 begin propagating along the acoustically conductive outer and inner housings 212 and 210 (which, as previously set forth, are formed from the upper body portion 308 and the upper projecting member 307 of the intermediate body portion 306, respectively) along paths 330 and 332. The acoustic energy continues propagating along the outer and inner housings 212 and 210 along paths 334 and 336. Upon arriving at the first support member 300 which couples the upper body portion 308 to the first projecting member 307 of the intermediate body portion 306, the acoustic energy propagating within the inner housing 210 along the path 336 propagates onto each of the dampening members 304a through 304d threadingly coupled to the longitudinal faces 302a through 302d of the first support member 300. As the acoustic energy propagates along each one of the dampening members 304a through 304d, acoustic stress waves propagating therealong radiates energy into the viscous fluid filling the sub-chambers 322a through 322d in a shearing motion, thereby resulting in the dissipation of the acoustic energy propagated into the dampening members 304a through 304d. Conversely, acoustic energy propagating through the outer housing 212 along the path 334 continues to propagate along the outer housing 212 along the paths 338 and 340 (see FIG. 3B) until striking the first impedance mismatch located along the radial axis B. At the impedance mismatch located along the radial axis B, the acoustic energy is reflected onto path 342 which, as illustrated in FIG. 3B, will now cause at least part of the reflected acoustic energy to propagate along the dampening members 314a through 314d where, by a similar process to that previously described, the acoustic stress waves propagating along each one of the dampening members 304a through 304d radiate energy into the viscous fluid filling the sub-chambers 320a through 320d in a shearing motion, thereby resulting in the dissipation of the acoustic energy propagated into the dampening members 314a through 314d.

As may be further seen in FIGS. 3A through 3C, the low frequency acoustic attenuator is generally symmetrical around a centrally located radial axis D. As a result, the low frequency acoustic attenuator 200 is equally equipped to attenuate acoustical energy originating within the section 204 of drill string located below the low frequency acoustic attenuator 200 and attempting to propagate to the section 208 of drill string located above the low frequency acoustic attenuator 200 as well as acoustical energy originating in the section 208 of drill string located above the low frequency acoustic attenuator 200 and attempting to propagate to the section 204 of drill string located below the low frequency acoustic attenuator 200. As a result, the low frequency acoustic attenuator 200 is equally suitable for deployment as the lower terminator 168 to protect the downhole date transceiver 152 from acoustic noise generated by the drill bit 156 as it is for deployment as the upper terminator 166' to protect the surface transceiver 132 of the drill string 126 from noise generated by the top drive 115 (or other mechanized system) responsible for vertical movement of the drill string 126. Further, because the low frequency acoustic attenuator 200 is generally symmetrical around the centrally located radial axis D, the operation of the interdigitated series 210-3 and 210-4 of dampening members is the same as the operation of the interdigitated series 210-1 and 210-2 of dampening members previously set forth and need not be described in further detail.

Preferably, each one of the aforedescribed generally cylindrical dampening members 304a through 304d, as well as the remaining ones of the generally cylindrical dampening members 304a through 304d, the generally cylindrical dampening members 316a through 316d and the generally cylindrical dampening members 318a through 318d, are formed of a thin metallic sleeve, configured for movement independent of the other dampening members 304a through 304 and are separated from one another by a radial distance selected to maximize the out-of-phase movement between the sleeves.

Figure 4A:
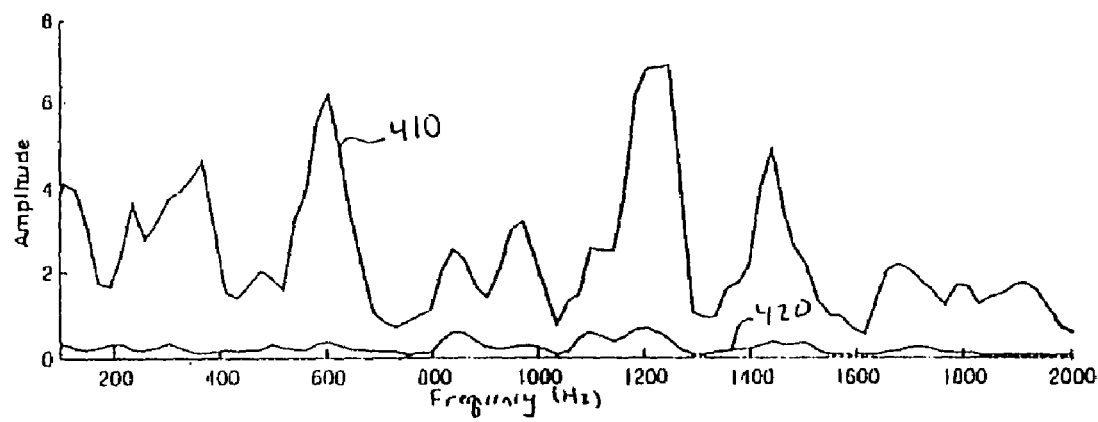
FIG. 4A is a graph illustrating the effect of the low frequency acoustic attenuator of FIGS. 2–3C on the noise level in a drilling environment.
Figure 4B:
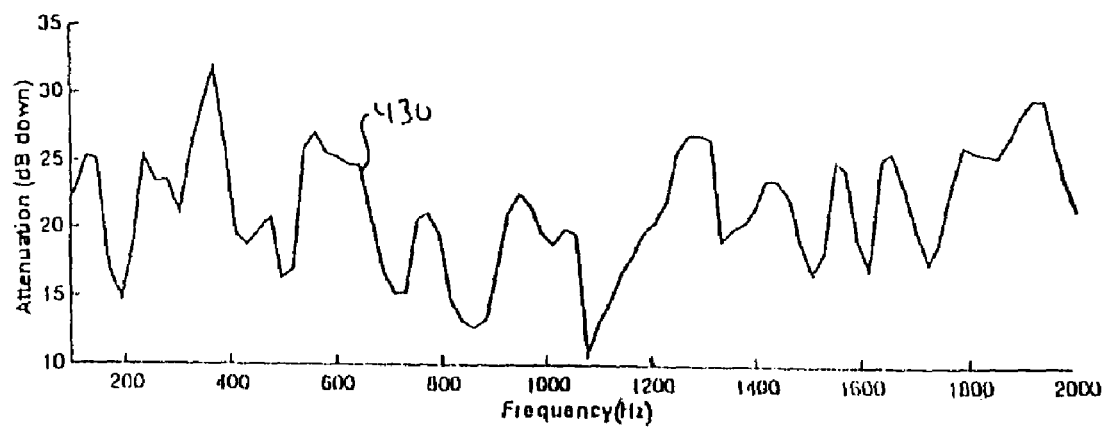
FIG. 4B is a graph which measures the level of acoustic attenuation for the noise levels of FIG. 4.

Referring next to FIGS. 4A and 4B, the amount of signal attenuation achieved by the low frequency acoustic attenuator when a 100 poise fluid is used as the viscous attenuative fluid will now be described in greater detail. More specifically, plot 410 of FIG. 4A shows the signal strength measured within the drill string 126 without use of the low frequency acoustic attenuator 200 while plot 420 of FIG. 4A shows the signal strength measured within the drill string 126 when the low frequency acoustic attenuator 200 is incorporated therewithin. Plot 430 of FIG. 4B shows the level of signal attenuation produced when the low frequency acoustic attenuator 200 is incorporated within the drill string 126. To determine the level of attenuation shown in plot 430 of FIG. 4B, the plot 420 of signal strength with attenuation is subtracted from the plot 410 of signal strength without attenuation. As may be seen in FIGS. 4A and 4BB, significant levels of signal attenuation is evidenced at frequencies below 2 kHz.

Returning now to FIG. 1, in closing, the uplink transmission of data signals and the downlink transmission of control signals will now be described briefly. The downhole transceiver 152 acquires downhole data and acoustically transmits the acquired data uplink along the acoustic transmission channel 164. The data signal passes through the drill pipe section 150 acoustically and is detected by the acoustic transceiver 148. As the data signal has begun to experience loss traversing the drill pipe section 150 the acoustic transceiver 148 commences a first regeneration of the original data signal. To do so, the acoustic transceiver 148 converts the detected acoustic data signal into an electrical data signal and passes it via a link (not shown), for example, an electrical link, to the acoustic transceiver 144 where the original data signal is regenerated therefrom. The regenerated acoustic data signal continues to propagate acoustically along the acoustic transmission channel 164, specifically, the drill pipe section 142, again, experiencing loss, until detected by the acoustic transceiver 140 where a second regeneration of the original data signal is commenced. Here, the acoustic transceiver 140 converts the detected data signal to an electrical data signal and passes it, via the aforementioned link between the acoustic transceiver 140 and the acoustic transceiver 136, to the acoustic transceiver 136, where the original data signal is again regenerated therefrom.

The regenerated data signal continues acoustic propagation along the acoustic transmission channel 164, specifically, the drill pipe section 134, until being detected by the surface transceiver 132. The surface transceiver 132 is responsible for converting the acoustically propagated data signal into an electrical data signal and transmitting the converted data signals to their final destination, here, remote data processing unit 174 on the surface. It is contemplated that the surface transceiver 132 may include various types of conventionally configured telemetry equipment. For example, the surface transceiver 132 may include a wireless transmitter/receiver system for exchanging signals with the remote data processing unit 174. In this configuration, the link (not shown) between the surface transceiver 132 and the remote data processing unit 174 would be a wireless link. Alternately, the surface transceiver 132 may include a wireline transmitter/receiver system and a swivel, in which case, the link between the surface transceiver 132 and the remote data processing unit 174 would be a wireline link. For example, a wireline transmitter/receiver system suitable for the purposes contemplated herein is disclosed in U.S. Pat. No. 4,314,365 to Petersen et al. Further details regarding the link between the surface transceiver 132 and the remote data processing unit 174 is set forth in co-pending U.S. patent application Ser. No. 10/882,730, entitled "A Drill String Incorporating An Acoustic Telemetry System Employment One Or More Low Frequency Acoustic Attenuators And An Associated Method Of Transmitting Data" and previously incorporated by reference as if reproduced in its entirety.

Regardless of the specific configuration thereof, once the surface transceiver 132 has forwarded the data to the remote data processing unit 174 located on the surface, the remote data processing unit 174, for example, a personal computer ("PC") or other computing system, analyzes the received data signals related to the downhole information acquired by the downhole data transceiver 152. Alternately, of course, the remote data processing unit 174 may simply be a data recorder which stores data for subsequent processing by a second remote data processing unit (not shown), typically, one at a location remotely located relative to the drill site 110.

It is also contemplated that the remote data processing unit 174 may be further configured to issue commands to the various devices attached to the drill strong 126 such as the downhole data transceiver 152, for example, to initiate, terminate or modify various parameters related to data collection. Commands issued by an operator of the remote data processing unit 174, for example, via a user interface (not shown) thereof, are transmitted to the surface transceiver 132 via the link 176. In turn, the surface transceiver 132 acoustically transmits the received command downlink through the drill pipe section 134. The acoustically transmitted command is received by the acoustic transceiver 136 which converts it into an electrical signal for transmission to the acoustic transceiver 140 via an electrical link (not shown). From the received electrical signal, the acoustic transceiver 140 regenerates the command for further acoustic propagation downlink through the drill pipe section 142 of the acoustic transmission channel 164. The regenerated acoustic command is subsequently detected by the acoustic transceiver 144 which, in a manner similar to the acoustic transceiver 136, converts the received acoustic command into an electrical signal for transmission to the acoustic transceiver 148 via an electrical link (not shown). In turn, the acoustic receiver 148 regenerates the original downlink command from the received electrical signal and acoustically transmits the regenerated command through the drill pipe section 150 of the acoustic data transmission channel 164. Subsequently, the regenerated downlink acoustic command is detected by the downhole data transceiver 152, which executes the received command.

Thus, there has been described and illustrated herein, a low frequency acoustic attenuator uniquely configured for attenuating acoustic signals below 5 kHz and preferably in a low frequency bandwidth extending from about 300 Hz to about 2 kHz. It should be clearly understood, however, that numerous variations and modifications of the techniques disclosed herein will become apparent to those skilled in the art once the above disclosure is fully appreciated. Accordingly, it is fully intended that the following claims be interpreted to embrace all such variations and modifications.

What is claimed is:

1. An acoustic attenuator, comprising:
an external housing having an inner side surface which defines an interior chamber; and
at least one dampening member acoustically coupled to said external housing;
wherein acoustic energy propagating within said external housing is deflected into said at least one dampening member for acoustic dispersal thereby,
wherein said acoustic attenuator further comprises first and second impedance mismatches in the external housing to trap acoustic energy between the first and second impedance mismatches.

2. The acoustic attenuator of claim 1, wherein said fast and second impedance mismatches are formed by first and second variances, respectively, in the radial dimension of said external housing.

3. The acoustic attenuator of claim 1, wherein said at least one dampening member is positioned within said interior chamber and physically coupled to said external housing.

4. The acoustic attenuator of claim 3, wherein said interior chamber is filled with a viscous fluid capable of absorbing acoustic energy.

5. The acoustic attenuator of claim 3, wherein said interior chamber is filled with pressurized nitrogen, said pressurized nitrogen capable of absorbing acoustic energy.

6. The acoustic attenuator of claim 3, wherein acoustical noise in the range of about 400 Hz to about 2 kHz is deflected into said at least one dampening member and dissipated within said interior chamber.

7. The acoustic attenuator of claim 3, wherein each one of said at least one dampening member is comprised of a generally cylindrical sleeve having a first end coupled to said external housing and a second end terminating in said interior chamber.

8. The acoustic attenuator of claim 3, wherein each one of said at least one dampening member is threadingly engaged to said external housing.

9. The acoustic attenuator of claim 3, wherein said at least one dampening member is comprised of a plurality of generally cylindrical, nested sleeves, each having a first end coupled to said external housing and a second end terminating in said interior chamber.

10. The acoustic attenuator of claim 9, wherein said first and second impedance mismatches are formed by first and second variances, respectively, in the radial dimension of said external housing.

11. The acoustic attenuator of claim 3, wherein said at least one dampening member further comprises:
   a first plurality of generally cylindrical, nested sleeves, each having a first end coupled to said external housing and a second end terminating in said interior chamber; and
   a second, oppositely disposed, plurality of generally cylindrical, nested sleeves, each having a first end coupled to said external housing and a second end terminating in said interior chamber;
   wherein said first plurality of generally cylindrical, nested sleeves are interdigitated with said second plurality of generally cylindrical, nested sleeves.

12. The acoustic attenuator of claim 11, wherein said first and second impedance mismatches are formed by first and second variances, respectively, in the radial dimension of said external housing.

13. An acoustic attenuator, comprising:
   an inner housing that transports a fluid flow;
   an outer housing disposed around the inner housing to define an interior chamber between the inner and outer housing;
   a first plurality of nested sleeves, each having a first end coupled to said outer housing and a second end terminating in said interior chamber; and
   a second, oppositely disposed, plurality of nested sleeves, each having a first end coupled to said outer housing and a second end terminating in said interior chamber,
   wherein said first plurality of nested sleeves are interdigitated with said second plurality of nested sleeves.

14. The acoustic attenuator of claim 13, wherein the inner housing, the outer housing, and the first and second plurality of nested sleeves are generally cylindrical.

15. The acoustic attenuator of claim 13, wherein the interior chamber contains a viscous fluid.

* * * * *